J. C. STEVENS.
HOOK.
APPLICATION FILED JUNE 13, 1916.

1,214,092.

Patented Jan. 30, 1917.

Witness
J. C. Simpson.
Henry T. Bright.

Inventor
J. C. Stevens.
By
Attorneys

UNITED STATES PATENT OFFICE.

JAMES C. STEVENS, OF APPLE RIVER, ILLINOIS, ASSIGNOR TO NANNETTE L. STEVENS, OF APPLE RIVER, ILLINOIS.

HOOK.

1,214,092.   Specification of Letters Patent.   Patented Jan. 30, 1917.

Application filed June 13, 1916. Serial No. 103,459.

*To all whom it may concern:*

Be it known that I, JAMES C. STEVENS, a citizen of the United States, residing at Apple River, in the county of Jo Daviess, State of Illinois, have invented certain new and useful Improvements in Hooks; and I do hereby declare the following to be a full, clear, and exact description of the invention, such as will enable others skilled in the art to which it appertains to make and use the same.

This invention relates to hooks and particularly to that type employed in latching gates and doors.

The object of the invention is to provide a hook of the type named constructed of a single length of metal and formed in such manner as to provide a hand hold whereby it is rendered possible to latch and unlatch the hook with the use of only one hand and with very little effort.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
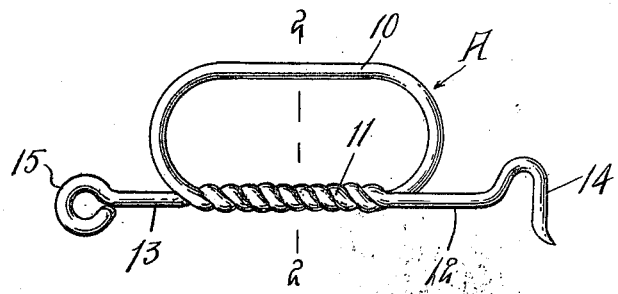
Figure 2:
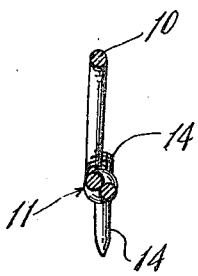

Figure 1 is a view in elevation of a hook constructed in accordance with the invention, and Fig. 2, a section on the line 2—2 of Fig. 1.

Referring to the drawings the improved hook is shown as comprising a single length of wire A which is bent centrally to form a loop 10 which constitutes a hand hold. The returned portions of the wire are then twisted upon themselves as at 11 to constitute one side of the loop 10 and also a portion of the shank of the hook. The terminal portions of the wire A are then carried beyond respective ends of the loop 10 as at 12 and 13 and these portions 12 and 13 also constitute parts of the shank of the hook. The free end of the portion 12 terminates in the hook 14, while the free end of the portion 13 terminates in a loop or eye 15 whereby the hook may be secured to a desired part.

By providing the loop 10 in the manner described it will be obvious that there is formed a hand hold which will permit the hook to be grasped in such manner that it can be easily latched and unlatched with the use of but a single hand.

What is claimed is:—

A hook formed from a single length of metal bent intermediately of its ends to produce a loop constituting a hand hold, the terminal portion of the length of metal being twisted upon themselves within the limits of the loop and then extended beyond respective ends of the loop, a hook formed on the outer end of one terminal portion, and a loop formed on the outer end of the other terminal portion.

In testimony whereof, I affix my signature, in the presence of two witnesses.

JAMES C. STEVENS.

Witnesses:
  JEAN BEALL,
  FLORA A. SPEER.

Copies of this patent may be obtained for five cents each, by addressing the "Commissioner of Patents, Washington, D. C."